(12) United States Patent
Ohtsu

(10) Patent No.: US 6,845,067 B2
(45) Date of Patent: Jan. 18, 2005

(54) OPTICAL PICKUP POSITION CONTROL METHOD

(75) Inventor: Hiroshi Ohtsu, Fukushima (JP)

(73) Assignee: Sony Computer Entertainment Inc., Tokyo (JP)

(*) Notice: Subject to any disclaimer, the term of this patent is extended or adjusted under 35 U.S.C. 154(b) by 516 days.

(21) Appl. No.: 10/011,375

(22) Filed: Oct. 22, 2001

(65) Prior Publication Data
US 2002/0054549 A1 May 9, 2002

(30) Foreign Application Priority Data
Oct. 23, 2000 (JP) ......................................... 2000-323105

(51) Int. Cl.$^7$ ............................................. G11B 7/095
(52) U.S. Cl. .............................. 369/44.32; 369/53.34; 369/53.18
(58) Field of Search ........................... 369/44.32, 53.34, 369/53.18

(56) References Cited

U.S. PATENT DOCUMENTS

| | | | | |
|---|---|---|---|---|
| 4,611,287 A | * | 9/1986 | Kobayashi et al. | 701/123 |
| 5,808,983 A | * | 9/1998 | Tsutsui et al. | 369/44.29 |
| 5,828,636 A | | 10/1998 | Matusmoto | |
| 6,115,333 A | * | 9/2000 | Igarashi | 369/44.27 |
| 6,115,334 A | * | 9/2000 | Tsutsui et al. | 369/44.32 |
| 6,269,062 B1 | * | 7/2001 | Minemura et al. | 369/47.53 |
| 6,381,203 B1 | * | 4/2002 | Muramatsu | 369/47.17 |

FOREIGN PATENT DOCUMENTS

| | | |
|---|---|---|
| EP | 0 749 117 | 12/1996 |
| EP | 0 840 295 | 5/1998 |
| EP | 1 043 717 | 10/2000 |
| JP | 10-083543 | 3/1998 |
| JP | 11-283256 | 10/1999 |
| JP | 11-316959 | 11/1999 |
| JP | 2000-149282 | 5/2000 |
| JP | 2001-176093 | 6/2001 |

* cited by examiner

*Primary Examiner*—Hoa T. Nguyen
*Assistant Examiner*—Michael V. Battaglia
(74) *Attorney, Agent, or Firm*—Katten Muchin Zavis Rosenman (57) ABSTRACT

A position control method, which positions the relative position of an optical disk and an optical pickup to a position that provides the optimum value of the jitter value of the detection signal obtained by detecting the reflected light of an optical spot, has a jitter value acquisition procedure, which carries out multiple feed operations within the adjustment range of the relative position and obtains the jitter value at each feed position, an edge position setting procedure which sets as the edge positions relative positions that exceed a prescribed preset jitter threshold value, an optimum position computation procedure, which computes the optimum position that yields the optimum value for the jitter value, and an edge position setting procedure that sets the edge positions on the condition that there are at least two relative positions that yield a jitter value that exceeds the jitter threshold value.

17 Claims, 10 Drawing Sheets

OPTICAL PICKUP POSITION CONTROL METHOD

FIELD OF THE INVENTION

The present invention concerns an optical pickup position control method that is used in an optical disk device that records and/or plays back information by shining an optical spot from an optical pickup onto an optical disk, and that positions the relative position of said optical disk and said optical pickup in a position that gives the optimum value of the jitter value of the detection signal obtained by detecting the reflected light of said optical spot.

BACKGROUND OF THE INVENTION

An optical disk device that records and plays back information on an optical disk such as a CD, DVD, CD-ROM-, DVD-ROM-, CD-R, DVD-R, etc., conventionally has an optical pickup that shines a laser light or other optical spot onto the optical disk and plays back or records information, and a drive device that adjusts the relative position between the optical disk and the optical pickup. In such an optical device, the control system, which includes the drive device, is provided with an automatic adjustment mechanism that adjusts the operation center position of skew, focus, etc. to the optimum position in order to minimize the effect of the jitter that occurs in the playback signal (RF signal) that is detected by the optical pickup, and the skew and focus operation center position is determined by, for example, procedures such as the following.

Figure 10:
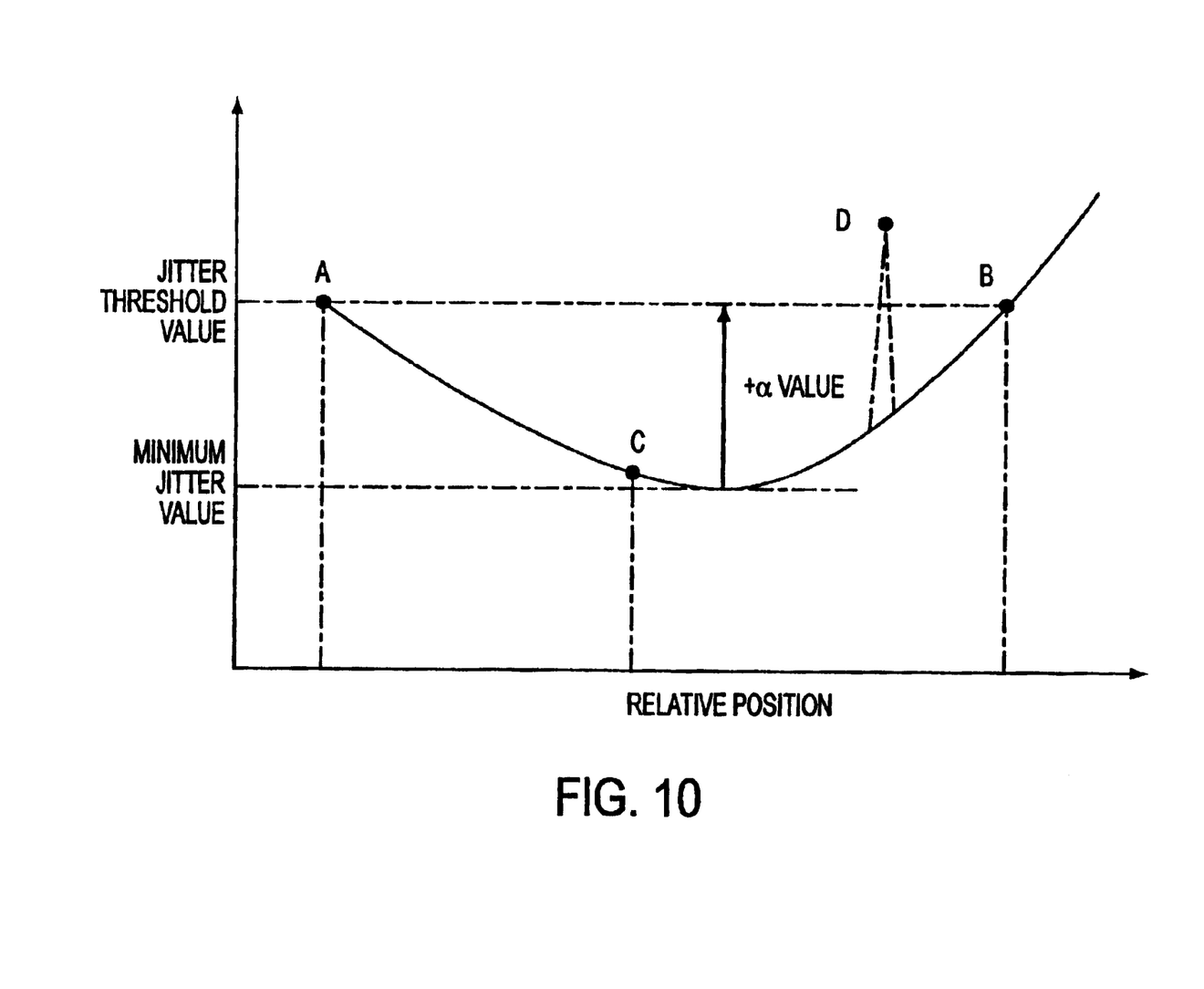
FIG. 10 is a graph explaining the procedure for setting the optimum position in a prior art optical pickup position control method.

(1) If there is a relationship as shown in FIG. 10 between the jitter value and the relative position of the optical disk and the optical pickup, a jitter value that is greater than the minimum jitter value by a standard amount is taken as the jitter threshold value. For this jitter threshold value, the upper limit of the error-correctable jitter value is mainly taken as the standard.

(2) Taking point A of FIG. 10 as the standard, while varying the relative position of the optical disk and the optical pickup, one obtains the jitter value at each position and determines the relative position of the two that exceeds a set jitter threshold value, that is, the relative position (edge position) of the upper value of the optical disk and the optical pickup at point B.

(3) When edge position point B is determined in the relative position adjustment of the optical disk and the optical pickup, point C, which is the midpoint between point A and point B, is set as the operation center position in the relative position adjustment of the optical disk and the optical pickup.

However, a problem with such a method of setting the operation center position in the relative position adjustment of the optical disk and the optical pickup is that, because it is taken as a premise that the effect of any disturbance is not received, if the effect of any disturbance is received, it is impossible to set the accurate operation center position corresponding to the jitter characteristics. That is, if a disturbance acts on the optical disk device, such as damage occurring to the optical disk or vibration during measurement of the jitter value, then, as shown by the dotted line in FIG. 10, the jitter value becomes spotwise large, so a point D that exceeds the jitter threshold value arises before reaching point B in FIG. 10, and therefore if the operation center position is computed based on point D and point A, an incorrect operation center position will be set.

It is an object of the present invention to provide an optical pickup position control method that makes it possible, in positioning the relative position of an optical disk and an optical pickup, to set the correct operation center position even if there is an effect by a disturbance, etc.

SUMMARY OF THE INVENTION

The optical pickup position control method of the present invention, being an optical pickup position control method that is used in an optical disk device that records and/or plays back information by shining an optical spot from an optical pickup onto an optical disk, and that positions the relative position of said optical disk and said optical pickup in a position that gives the optimum value of the jitter value of the detection signal obtained by detecting the reflected light of said optical spot, has a jitter value acquisition procedure that performs multiple feed operations within the adjustment range of said relative position and obtains the jitter value at each feed position. An edge position setting procedure is provided that, based on the feed positions and jitter values obtained by this jitter value acquisition procedure, sets as the edge positions relative positions that will be greater than a preset prescribed jitter threshold value. An optimum position computation procedure is provided that computes the optimum position that will give the optimum value of said jitter value, based on the edge positions set by the edge position setting procedure, and an optimum position adjustment procedure is provided that adjusts the relative position of said optical disk and said optical pickup to the optimum position computed by the optimum position computation procedure. The edge position setting procedure sets the edge positions on the condition that there are at least two relative positions that will give a jitter value that exceeds said jitter threshold value.

It is desirable to adopt the method of the present invention if one is to perform positioning, in the relative position between an optical disk and an optical pickup, of the tilt position and focus position, etc. between the disk and pickup. The tilt position expresses the inclination (skew) position of the optical pickup with respect to the optical disk, and the tilt position must be adjusted in order to cause the optical spot from the optical pickup to be incident to the information recording surface of the optical disk at right angles. The focus position must be adjusted so that the depth of focus of the optical spot from the optical pickup is fixed; specifically, position adjustment can be achieved by applying a prescribed bias voltage to a focus servo mechanism. The jitter value can be obtained by taking out the high-frequency components of the RF signal that serves as the detection signal output from the optical pickup, and performing the prescribed signal processing. Also, in setting the edge positions, it is set as a condition that there be at least two relative positions of the optical disk and optical pickup that exceed the jitter threshold value, but it is preferable to have three relative positions that exceed the jitter threshold value. By setting the condition that there be at least two relative positions that exceed the jitter threshold value, said edge positions are never recognized as the edge positions uniquely, even if a part occurs that spotwise exceeds the jitter threshold value because of vibration or other disturbance. Therefore the optimum operation center position can be set without being affected by any disturbance, etc.

In the foregoing, it is desirable that acquisition of the jitter value at each feed position in said jitter value acquisition procedure be accomplished by rotating the optical disk at a prescribed speed, taking in multiple jitter values along the inside circumference of said optical disk, and taking the average of the obtained multiple jitter values excluding the maximum value. By thus taking the average value of the multiple jitter values that are obtained, the effect of damage or other disturbances arising on the surface of the optical disk can be reduced, thus making it possible to even more accurately determine the operation center position of the optical disk and optical pickup. In particular, by calculating the average value excluding the maximum value, then even if a scratch, etc. arises that extends in the radial direction of the disk, this can be excluded when computing the operation center position.

If the method of the present invention employs a jitter characteristics smoothing procedure that, following said jitter value acquisition procedure, smoothes the obtained jitter characteristics if the jitter characteristics by which the jitter values corresponding to the feed positions are plotted are judged not to conform to the preset jitter characteristics, it is desirable that the edge position setting procedure and optimum position computation procedure be carried out based on this jitter characteristics smoothing procedure. In such a situation, the jitter characteristics smoothing procedure can be carried out if one checks the characteristics of the jitter value with respect to the relative position of the optical disk and optical pickup and the jitter characteristics curve is neither an increasing function, nor a decreasing function, nor convex upward, nor convex downward. Specifically, the jitter characteristics smoothing procedure is carried out if variability arises in the jitter values obtained in the feed positions in the jitter value acquisition procedure due to surface deviation of the optical disk, etc.

Figure 7:
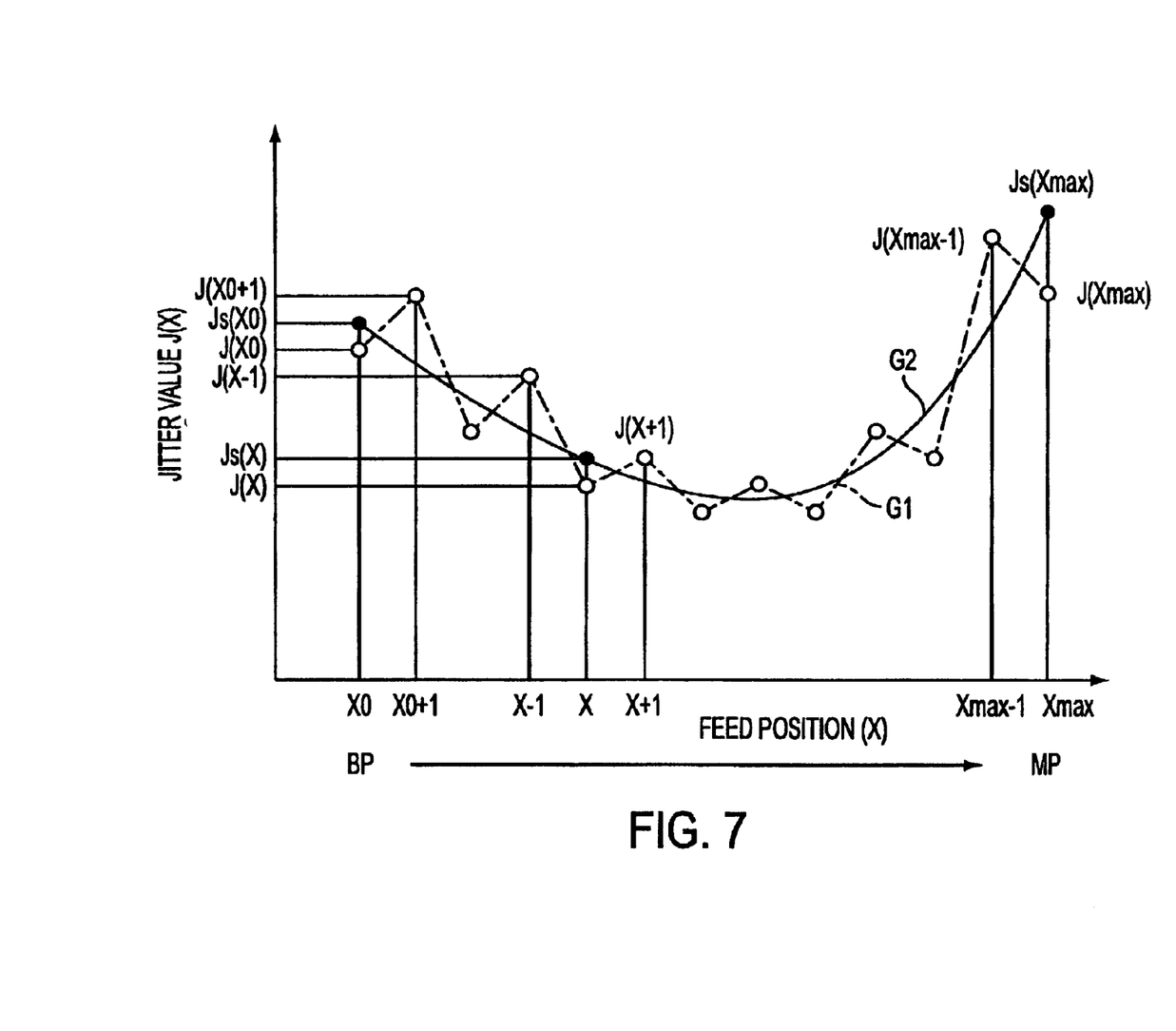
FIG. 7 is a graph explaining the jitter characteristics smoothing procedure of the invention.

Specifically, with reference to FIG. 7, in the jitter characteristics smoothing procedure, denoting the jitter values obtained at feed position $X0 \leq X \leq Xmax$ by $J(X0) \leq J(X) \leq J(Xmax)$, the smoothed jitter values $Js(X0)$, $Js(X)$, $Js(Xmax)$ at each feed position can be calculated by the following formulas ((1))–((3)).

$$Js(X0) = [3 \times J(X0) + J(X0+1)]/4 \qquad <1>$$

$$Js(X) = [J(X-1) + 2 \times J(X) + J(X+1)]/4 \qquad <2>$$

$$Js(Xmax) = [J(Xmax-1) + 3 \times J(Xmax)]/4 \qquad <3>$$

In the edge position setting procedure, the edge positions are set as follows based on the smoothed jitter characteristics thus obtained.
(1) Set as the first edge position the feed position of jitter value Jedge, which is the smaller of $Js(X0)$ and $Js(Xmax)$ (first edge position setting step).
(2) Compare this Jedge and each $Js(X)$ in sequence from this first edge position in the direction toward the feed position at which another $Js(X0)$ or $Js(Xmax)$ is taken, and take as the second edge position the feed position at which $Jedge \leq Js(X)$ (second edge position setting step).

Also, in the optimum position computation procedure, which is done based on the first and second edge positions set in the edge position setting procedure, specifically it calculates the midpoint of the obtained first and second edge positions and takes this midpoint as the optimum position (operation center position).

By thus carrying out the jitter characteristics smoothing procedure and then the jitter position setting procedure and the optimum position computation procedure, one can eliminate the variability in the jitter values that is caused by the surface deviation, etc. that occurs on individual optical disks and can compute the optimum position, and thus in the optimum position adjustment procedure one can more accurately perform positioning of the optical disk and optical pickup.

And by calculating by above formulas <1>–<3> in the jitter characteristics smoothing procedure and carrying out the edge position setting procedure by steps (1) and (2), even if it has jitter characteristics that are asymmetrical with respect to the optimum position (operation center position), the appropriate edge positions can be ascertained, and a more appropriate optimum position can be computed in the optimum position computation procedure.

It is desirable that the aforesaid optical pickup position control method of the present invention has an implementation decision procedure that decides, according to the type of the optical disk, whether to carry out the jitter value acquisition procedure, the edge position setting procedure, the optimum position computation procedure, and the optimum position adjustment procedure. Deciding according to the type of the optical disk means basically deciding whether to carry out the procedures according to the density of the information recorded on the optical disk; for example, the recording density of the information on a CD or CD-ROM is low and the margin in the relative position adjustment is large, so it suffices to carry it out only for those in which the margin is small, such as DVD or DVD-ROM, without carrying out the position control method for the optical pickup.

By thus carrying out the position control method only if the margin in relative position adjustment is small, if a CD, etc. is mounted onto the optical disk device, data reading can begin without doing automatic adjustment, so starting of the optical disk device and beginning of reading of the data can be done more quickly.

EXPLANATION OF THE SYMBOLS

30 optical disk device
32 optical pickup
100 optical disk
S5, S6 jitter value acquisition procedure
S9 jitter characteristics smoothing procedure
S10 edge position setting procedure
S11 optimum position computation procedure
S12 optimum position adjustment procedure
S102 first edge position setting step
S107 second edge position setting step X1 first edge position
X2 second edge position
VP optimum position

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
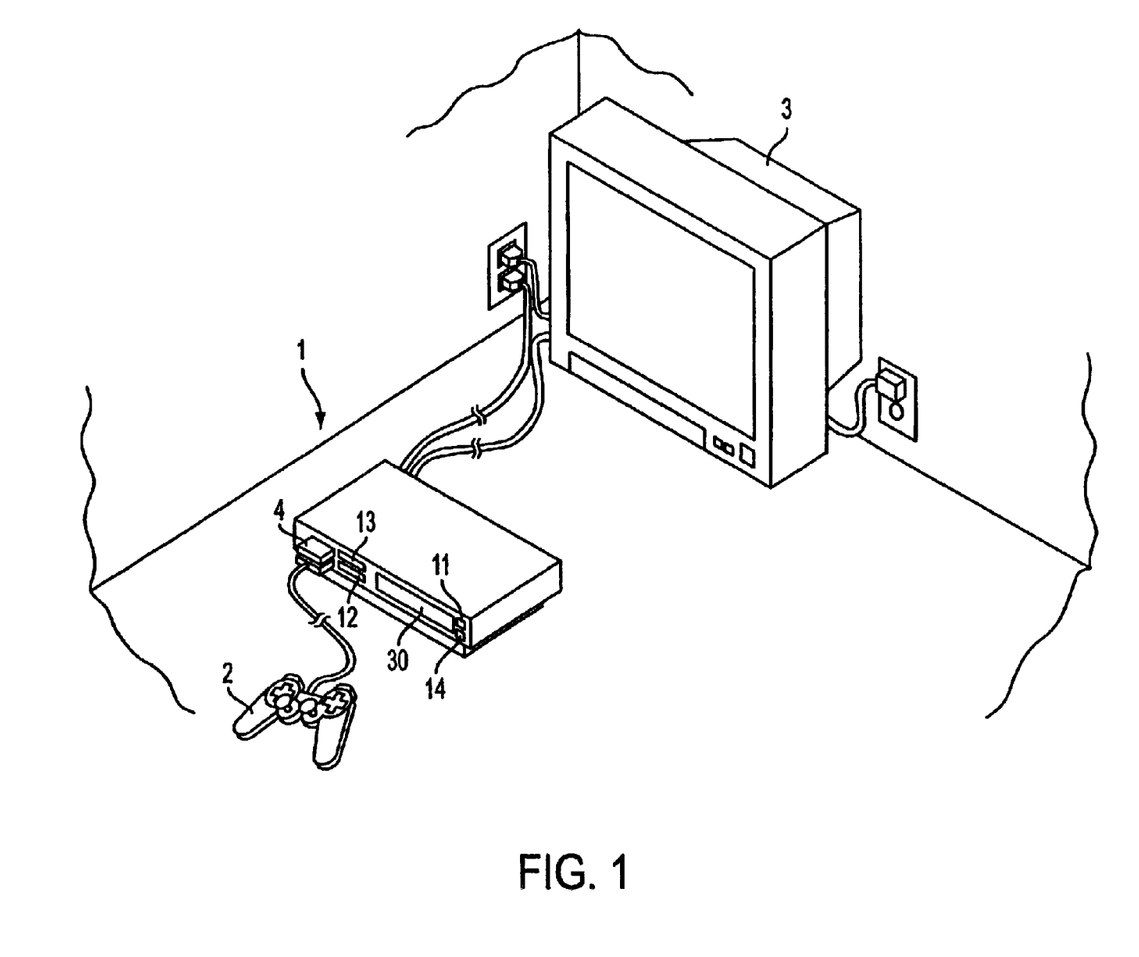
FIG. 1 is a rough perspective view of an entertainment device of an embodiment of the present invention.

FIG. 1 shows an entertainment device 1 on which is mounted an optical disk device that implements the optical pickup position control method of the present invention. Entertainment device 1 conventionally executes a game program when a user calls up a game program, etc. recorded on a CD, CD-ROM, DVD, DVD-ROM, or the like and gives instructions by manipulating an operation controller 2. The output of entertainment device 1 is connected to a television receiver or other display device 3, and the screens during execution are displayed on this display device 3. Power is delivered to entertainment device 1 from, for example, the commercial public power generally supplied to homes, and entertainment device 1 is started by turning on a master switch, not pictured, that is provided on the rear surface of the device and pressing a power switch 11 provided on the front surface of the device. Power switch 11 may also function as a reset button when it is pressed during operation of entertainment device 1.

Controller slot 12 and card slot 13 are provided on the front surface of entertainment device 1 Operation controller 2 is connected to controller slot 12, and memory card 4 is connected to card slot 13. Optical disk device 30 is provided near controller slot 12 and card slot 13, which are provided on the front surface of the device. This optical disk device 30 is a disk-loading optical disk device in which, by manipulating operation switch 14, a disk tray advances and retracts from entertainment device 1.

Figure 2:
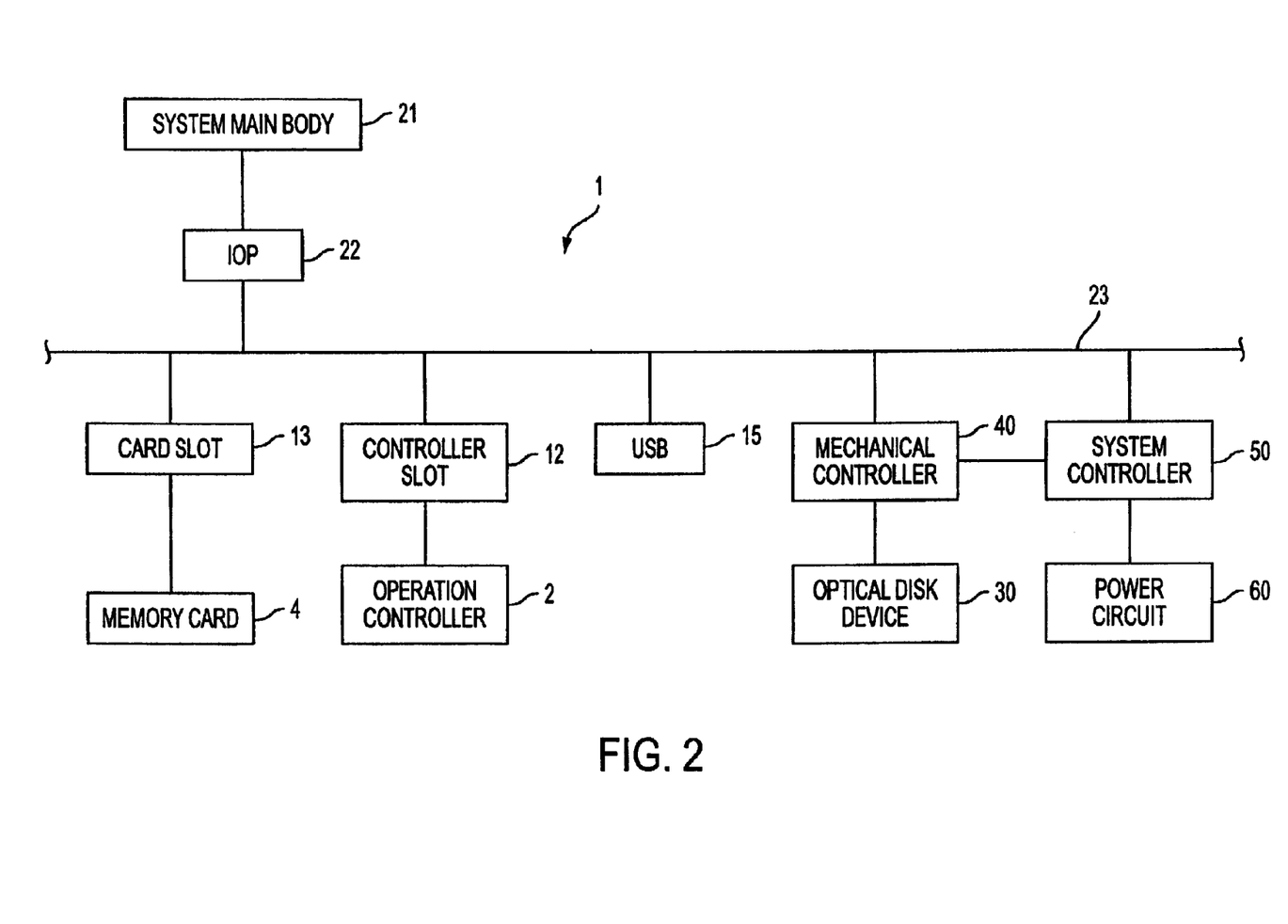
FIG. 2 is a block diagram showing the internal structure of the entertainment device.

As shown in the block diagram of FIG. 2, the device main body inside entertainment device 1 has system main body 21 as the main board on which the CPU is mounted, and I/O port 22, which is connected to system main body 21, and connected to I/O port 22, via bus line 23, are controller slot 12, card slot 13, and USB port 15, etc., as well as mechanical controller 40 and system controller 50. System main body 21 performs control of the device as a whole and computation processing of game programs and other software Through I/O port 22, main body 21 performs operation control of operation controller 2 and other external devices connected to controller slot 12, card slot 13, and USB port 15, etc. and of mechanical controller 40 and system controller 50, and it processes signals output from external devices, etc. connected to I/O port 22. Mechanical controller 40 performs operation control of optical disk device 30 as described in greater detail below, and optical disk device 30 is connected to bus line 23 via mechanical controller 40. System controller 50 controls power source circuit 60 and manages the power supply state of entertainment device 1 as a whole based on operation signals from power switch 11 and signals from sensors (not pictured) that monitor the temperature state of the CPU that constitutes system main body 21; power source circuit 60 is connected to bus line 23 via this system controller 50. Mechanical controller 40 and system controller 50 also have a direct port connection without going through bus line 23, and are constituted so that system controller 50 outputs signals of two levels, low and high, to mechanical controller 40 according to the operation signal of power switch 11. For example, it outputs Low if power switch 11 is pressed at initial startup, and it outputs High if power switch 11 is pressed during operation of entertainment device 1 and a restart command is given.

Figure 3:
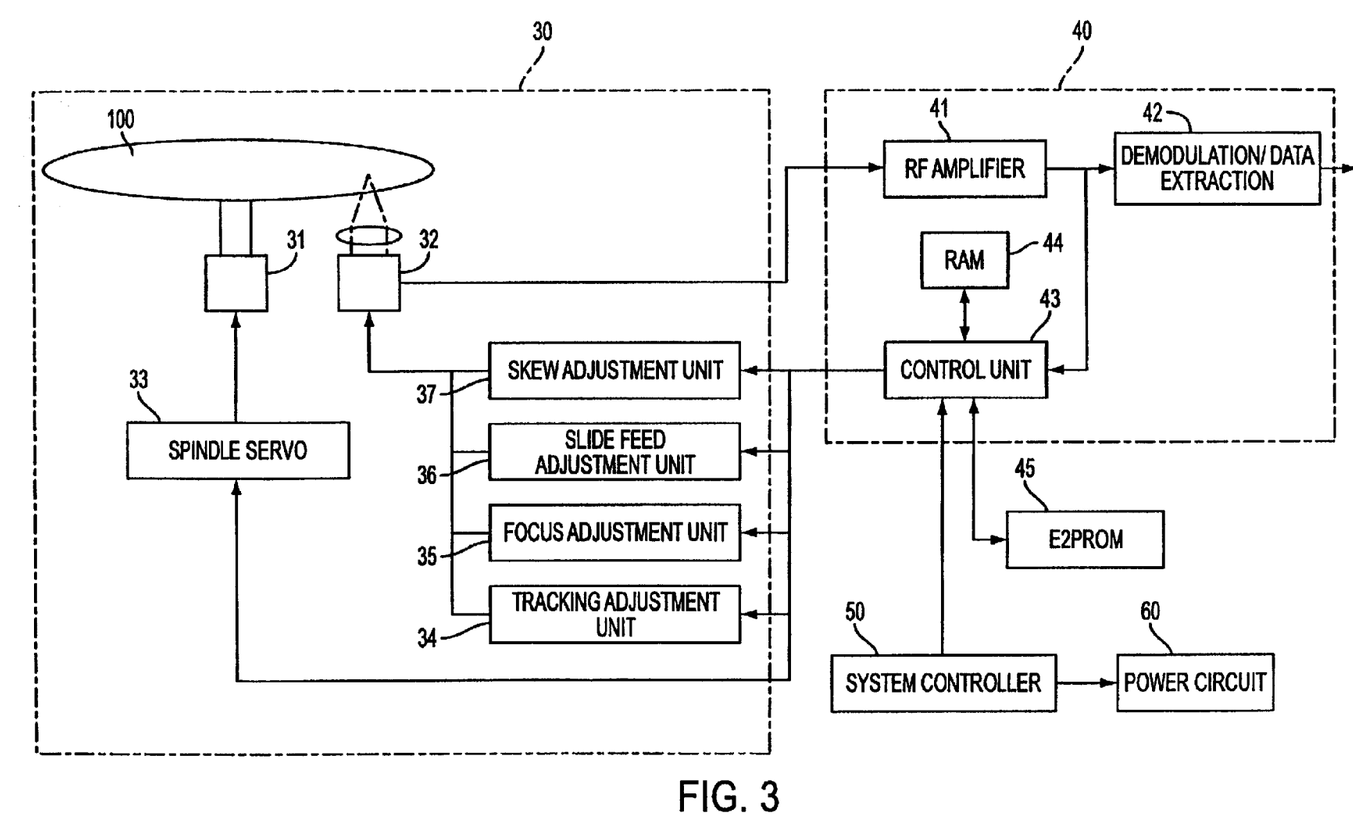
FIG. 3 is a block diagram showing the structure of the optical disk device, and the mechanical controller that controls such device.

As shown in FIG. 3, optical disk device 30 has spindle motor 31 and optical pickup 32, spindle servo unit 33, tracking adjustment unit 34, focus adjustment unit 35, slide feed adjustment unit 36, and skew adjustment unit 37. Although not pictured, adjustment units 34–37 are constituted so as to have a feed mechanism that adjusts the attitude of optical pickup 32 with respect to optical disk 100, and a stepping motor that serves as the drive source of this feed mechanism. Also, although not pictured in FIG. 3, provided on this optical disk device 30 are a disk tray loading mechanism for extending and retracting the disk tray from entertainment device 1, and a raising and lowering mechanism that raises and lowers spindle motor 31 and optical pickup 32 so that they do not interfere with the disk tray.

Spindle motor 31 rotates optical disk 100 mounted in the disk tray Provided on the end of the rotation shaft of said spindle motor 31 is a chucking member that engages with the center hole of optical disk 100. Spindle motor 31 is rotation-controlled by spindle servo unit 33 in such a way that information can be detected by optical pickup 32 regardless of the radial-direction position of optical pickup 32 with respect to optical disk 100. Tracking adjustment unit 34 has a two-axis device that adjusts the objective lenses that constitute optical pickup 32 so that the optical spot from optical pickup 32 is shined accurately onto the tracks off optical disk 100, an actuator that imparts driving force to such two-axis device, and a driver IC that drives this actuator. Focus adjustment unit 35 performs position adjustment of optical pickup 32 so that the depth of focus of the optical spot from optical pickup 32 is fixed with respect to the information recording surface of optical disk 100, and has an advance-and-retract mechanism that position-adjusts optical pickup 32 with respect to the information recording surface of optical disk 100 in the direction of approaching and withdrawing from it, a stepping motor that imparts driving force to this advance-and-retreat mechanism, and a driver IC that operates this stepping motor. Slide feed adjustment unit 36 adjusts the position, in the radial direction of optical disk 100, of optical pickup 32 by track jumping, etc.; although not pictured in the diagram, it has a thread feed mechanism that consists of a rack that extends along the radial direction of optical disk 100 and a gear that engages with this rack, a stepping motor that causes this gear to rotate, and a driver IC that drives this stepping motor. Optical pickup 32 is attached on the rack, and when the gear turns by the stepping motor, optical pickup 32 moves by means of the rack along the radial direction of optical disk 100. If track jumping is to be done, first, by the two-axis device of tracking adjustment unit 34, the center of the optical axis of the optical spot is aligned on the track to which the jump is to be made, then optical pickup 32 is slid by the slide feed mechanism. Skew adjustment unit 37 adjusts the tilt of optical pickup 32 with respect to optical disk 100 so that the optical spot shined from optical pickup 32 is incident perpendicular to optical disk 100.

Figure 4A:
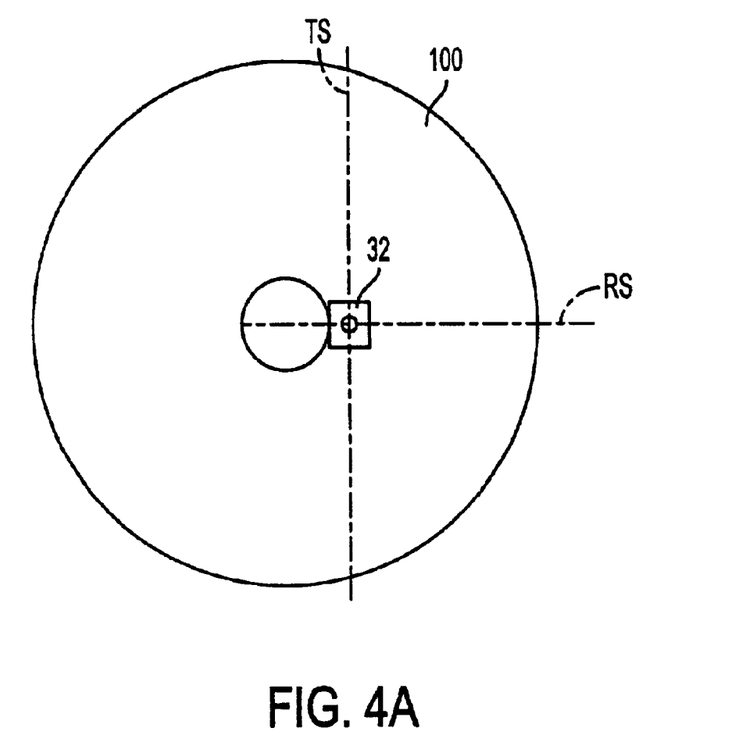
FIGS. 4A and 4B explain the method of skew adjustment associated with the tilt control of the method of the present invention.
Figure 4B:
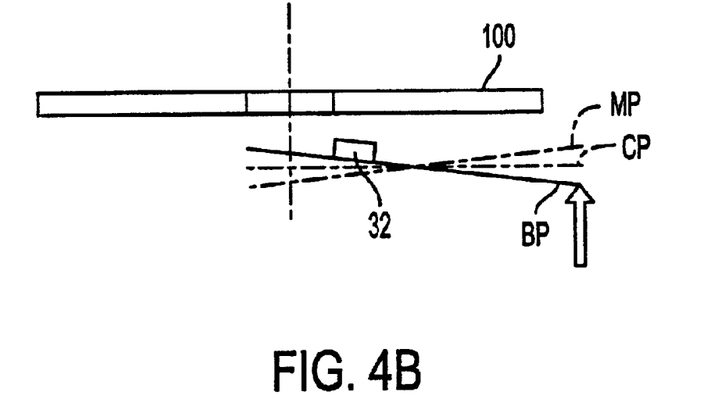

As shown in FIGS. 4A and 4B, skew adjustment unit 37 has a skew angle adjustment mechanism that adjusts the angle of optical pickup 32 with respect to optical disk 100 in the range from the base position BP to the maximum feed position MP, as well as a stepping motor (not pictured) that serves as the drive source for this skew angle adjustment mechanism and a driver IC (not pictured) that drives this stepping motor. By operating skew adjustment unit 37, optical pickup 32 is positioned in center position CP so as to lie exactly opposite the information recording surface of optical disk 100. In addition, center position CP is set during the manufacturing stage of entertainment device 1 as the operation center position to be set using a standard disk. Furthermore, skew adjustment unit 37 makes adjustments in radial skew direction RS, which is the radial direction of optical disk 100; it does not make any adjustments for the tangential skew direction TS, which is the direction of the tangent to the circle.

Returning to FIG. 3, mechanical controller 40 has RF amplifier 41, demodulation/data extraction unit 42, control unit 43, and RAM 44, and is connected directly to system controller 50 by the aforesaid port connection, and it is connected to E2PROM 45, which is mounted on the circuit board that includes mechanical controller 40. RF amplifier 41 amplifies the RF signal input from optical pickup 32 of optical disk device 30 and outputs it to demodulation/data extraction unit 42. Demodulation/data extraction unit 42 demodulates this RF signal and extracts the necessary data, and the extracted data is output via bus line 23 and I/O port 22 to system main body 21 and is processed by system main body 21. Control unit 43 outputs control commands to spindle servo unit 33, tracking adjustment unit 34, focus adjustment unit 35, slide feed adjustment unit 36, and skew adjustment unit 37 of optical disk device 30 and generates control commands as necessary, storing data in RAM 44 and calling out information recorded on E2PROM 45. Included as information recorded on E2PROM 45 are the maximum feed amount in initial operation of skew adjustment unit 37, the number of steps that yields the center position feed amount, information for deciding whether to cause skew adjustment unit 37 to perform automatic adjustment, information concerning the jitter minimum value measured using a standard disk in the manufacturing stage, and the +α value for adding the prescribed jitter amount to the jitter minimum value and generating the jitter threshold value. Also, the high-frequency component (HF) taken from the RF signal of optical pickup 32 that is amplified by RF amplifier 41 is input into control unit 43, the jitter value is obtained by control unit 43 based on this high-frequency component, and based on this, control commands are generated for adjustment units 34–37.

Figure 5:
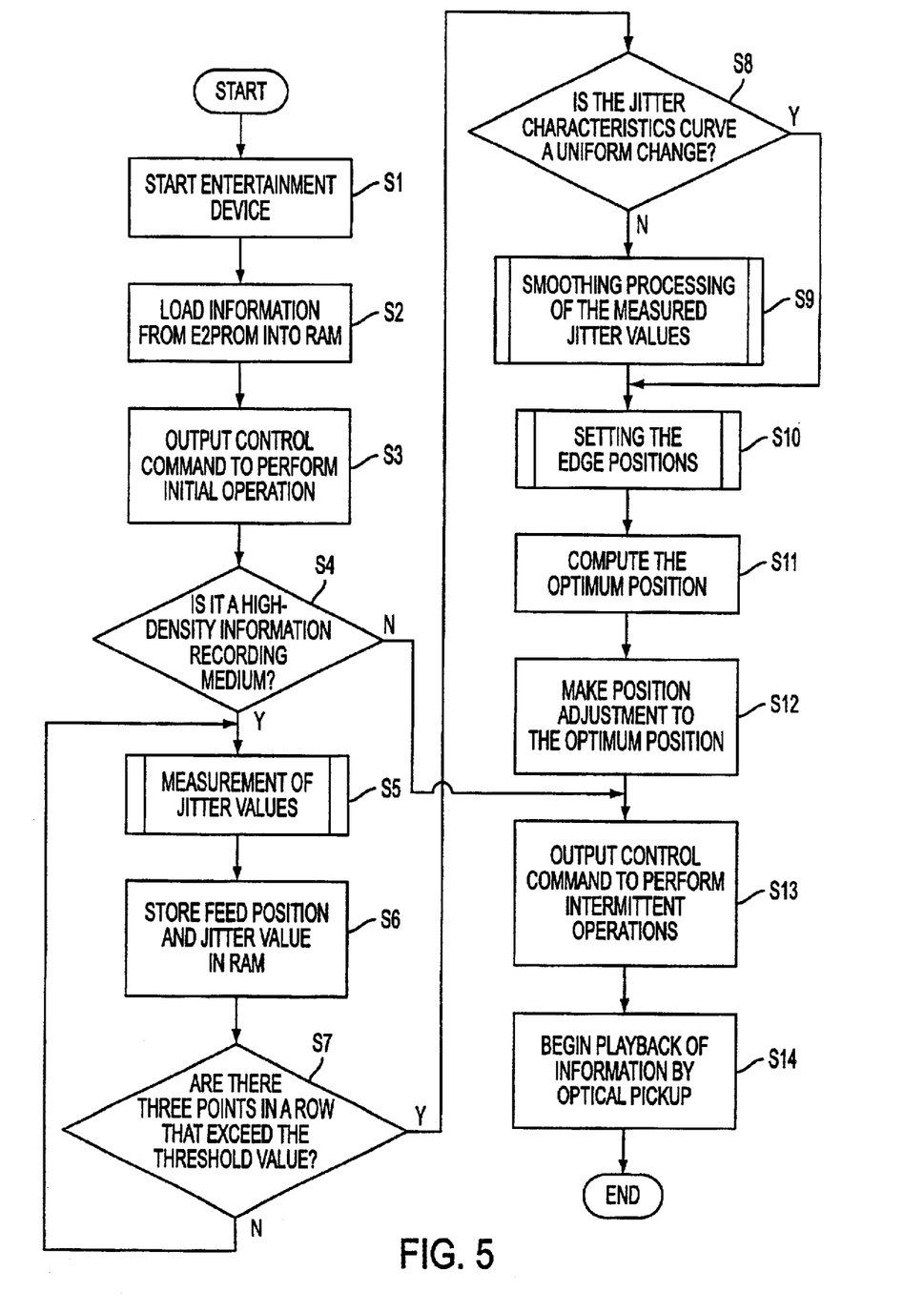
FIG. 5 is a flowchart expressing the optical pickup position control method of the present invention.

Next, with reference to the flowchart in FIG. 5, the position control procedure for optical pickup 32 by skew adjustment unit 37 and control unit 43 in entertainment device 1 will be described.

(1) When the master switch on the back of entertainment device 1 is turned on and power switch 11 on the front of the device is pressed, electric power is supplied via power circuit 60 to system main body 21, mechanical controller 40, and optical disk device 30, and entertainment device 1 starts (processing S1).

(2) Control unit 43 loads into RAM 44 the information recorded in E2PROM 45 (processing S2). The loaded information includes information concerning the initial operation of aforesaid skew adjustment unit 37, and information concerning whether to perform automatic adjustment of the tilt position.

(3) Based on the information concerning initial operation loaded into RAM 44, control unit 43 outputs a control command that causes skew adjustment unit 37 to execute an initial operation (processing S3). This initial operation has, specifically, a procedure that changes the inclination position of optical pickup 32 with respect to optical disk 100 in the direction from base position BP toward maximum feed position MP, a procedure that then changes the inclination position by the maximum feed amount in the direction toward base position BP, and a procedure that further changes it from base position BP by the center position feed amount, and following the initial operation, optical pickup 32 is positioned in center position CP, which is set in the manufacturing stage.

(4) If the user presses operation switch 14 and mounts optical disk 100 inside disk device 30, control unit 43 monitors the detection signal from RF amplifier 41 and decides whether mounted optical disk 100 is a DVD-ROM or other high-density information recording medium (processing S4: implementation decision procedure).

(5) If it is decided that optical disk 100 is a DVD-ROM or other high-density information recording medium, control unit 43 outputs a control command to skew adjustment unit 37, adjusts the tilt position of optical pickup 32 with respect to optical disk 100, measures the jitter value from the high-frequency component of the RF signal from RF amplifier 41 (processing S5), and stores in RAM 44 the number of steps of the feed position and the measured jitter value at each feed position (processing S6). Acquisition of jitter values by this jitter value acquisition procedure S5 and S6 is repeated until a tilt position of optical disk 100 and optical pickup 32 that is larger than the jitter threshold value becomes three points in a row (processing S7).

Figure 6:
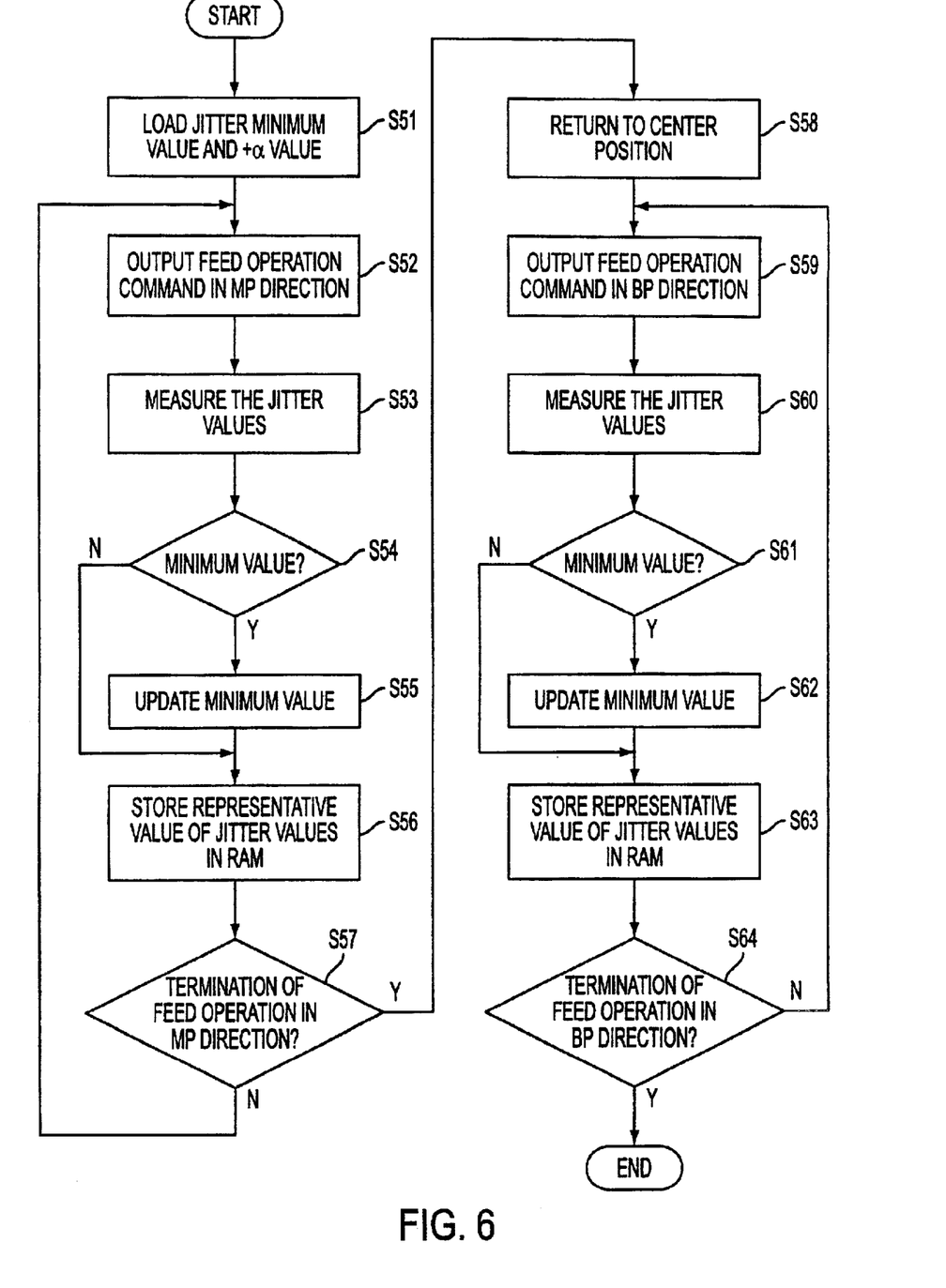
FIG. 6 is a flowchart expressing the jitter value acquisition procedure of the method of the present invention.

Jitter value acquisition procedure S5 and S6 is described as follows in greater detail, with reference to the flowchart shown in FIG. 6.

(5-1) Control unit 43 loads into RAM 44 the jitter minimum value recorded in E2PROM 45, and the +α value (processing S51). Thereupon, the control unit 43 generates and outputs to skew adjustment unit 37 a feed operation command of the prescribed distance in the direction from the current center position CP (see FIG. 4B) toward maximum feed position MP (the MP direction) (processing S52). This feed operation command is output as a number of steps of the stepping motor that constitutes skew adjustment unit 37.

(5-2) When the position of optical pickup 32 moves pursuant to said feed operation command, control unit 43 measures the jitter value based on the high-frequency component of the RF signal output from RF amplifier 41 (processing S53). Measurement of this jitter value is done 10 times at a take-in interval of 4 ms at the innermost-circumference radius position of optical disk 100 (disk radial direction 24 mm position).

(5-3) It is decided whether the jitter value measured by processing S53 is the minimum value (processing S54), and if it is, the minimum value of the jitter value in RAM 44 is updated (processing S55). Then control unit 43 takes the average of 9 of the 10 jitter values, excluding the maximum value, and stores it in RAM 44 as the typical value of the jitter values in said tilt position (processing S56).

(5-4) Control unit 43 decides, based on the current feed position and the measured jitter values, whether to terminate the feed operation (processing S57). The decision to terminate is made by deciding whether the current feed position is near maximum feed position MP (in this example, it is set to 3 steps before the maximum feed position) or whether the measured jitter value has been, for three times in a row, greater than the jitter value resulting when the +α value is added to the minimum jitter value. If control unit 43 decides not to terminate the operation, processing S52 through processing S57 are repeated until a decision to terminate results.

(5-5) When the feed operation in the MP direction terminates, optical pickup 32 is returned to center position CP (processing S58). The return operation is done by the same procedure as the procedure in the aforesaid initial operation.

(5-6) Upon the return to center position CP, control unit 43 generates and outputs a feed operation command concerning the direction toward base position BP (the BP direction) in the same way as in the case of the MP direction (processing S59), and performs measurement of the jitter value at said feed position (processing S60), judgment of the minimum value (processing S61), updating of the minimum value (processing S62), storage into RAM 44 (processing S63), and decision of whether to terminate the feed operation (processing S64).

(6) Control unit 43 decides whether a tilt position that exceeds the jitter threshold value has been obtained for three points in a row (processing S7). If it is decided that three tilt positions have not been obtained, jitter value acquisition procedure S5 and S6 is repeated. If it is decided that three tilt positions have been obtained for three points in a row, control unit 43 terminates jitter value acquisition and decides whether the jitter characteristics curve that is constituted by which one plots the feed positions and jitter values shows a uniform change as a whole processing S8). If said jitter characteristics curve is neither an increasing function, nor a decreasing function, nor convex upward, nor convex downward, the decision is made that it does not show a uniform change. If it is decided that as a whole the jitter characteristics curve shows a uniform change, one proceeds to the following processing, without doing smoothing processing.

(7) If it is decided that as a whole the jitter characteristics curve does not show a uniform change, smoothing processing is done on the measured jitter values (processing S9: jitter characteristics smoothing processing). This smoothing processing S9 is done specifically by the following procedure.

(7-1) Now, we assume that a plot of feed positions X and jitter values J(X) obtained by jitter value acquisition procedure S5 and S6 has characteristics G1 as shown in FIG. 7. In FIG. 7, feed position X is set so as to grow larger in the direction from base position BP to maximum feed position MP in FIG. 4B. These jitter characteristics G1, which show variability in the plot values, as a whole do not constitute a uniform change, nor are they recognized to be either an increasing function, a decreasing function, convex upward, or convex downward, so smoothing processing is done so that they can be ascertained as a uniform change as a whole.

(7-2) Denoting by Js(X) the smoothed jitter value at feed position X, smoothing processing is done by taking the average value while weighting the jitter value J(X) of given feed positions X at which the jitter value is measured and the jitter values J(X−1) and J(X+1) at feed positions X−−1 and X+1 before and after this feed position; in this embodiment it is determined based on the following formula <4>.

$$Js(X)=[J(X-1)+2\times J(X)+J(X+1)]/4 \quad <4>$$

The coefficient 2 of J(X) in this formula <4> is the weighting value, and the denominator 4 is the number of data points.

On the other hand, the smoothed jitter values Js(X0) and Js(Xmax) at edge feed positions X0 and Xmax are determined based on the following formulas <5> and <6>, because for these the jitter measured value on one side is lacking.

$$Js(X0)=[3\times J(X0)+J(X0+1)]/4 \quad <5>$$

$$Js(X\text{max})=[J(X\text{max}-1)+3\times J(X\text{max})]/4 \quad <6>$$

The coefficient 3 of J(X0) and J(Xmax) in these formulas <5> and <6> is the weighting value as in formula <4>, and the number of the denominator is the number of data points.

(7-3) If we replot the smoothed jitter values Js(X) at feed positions X obtained by the above formulas <4>–<6>, we can obtain jitter characteristics curve G2, from which we can ascertain a uniform change as a whole.

(8) When the desired jitter characteristics curve is obtained by the above procedure, the edge positions are set based on this jitter characteristics curve (processing S10: edge position setting procedure). Specifically, edge position setting procedure S10 is carried out based on the flowchart given in FIG. 8. In the following explanation, we assume that smoothing processing S9 is carried out, but if in branch processing S8 it is decided that there is no need to carry out smoothing processing S9, the same processing as the following is carried out based on the actual measured jitter values J(X).

Figure 8:
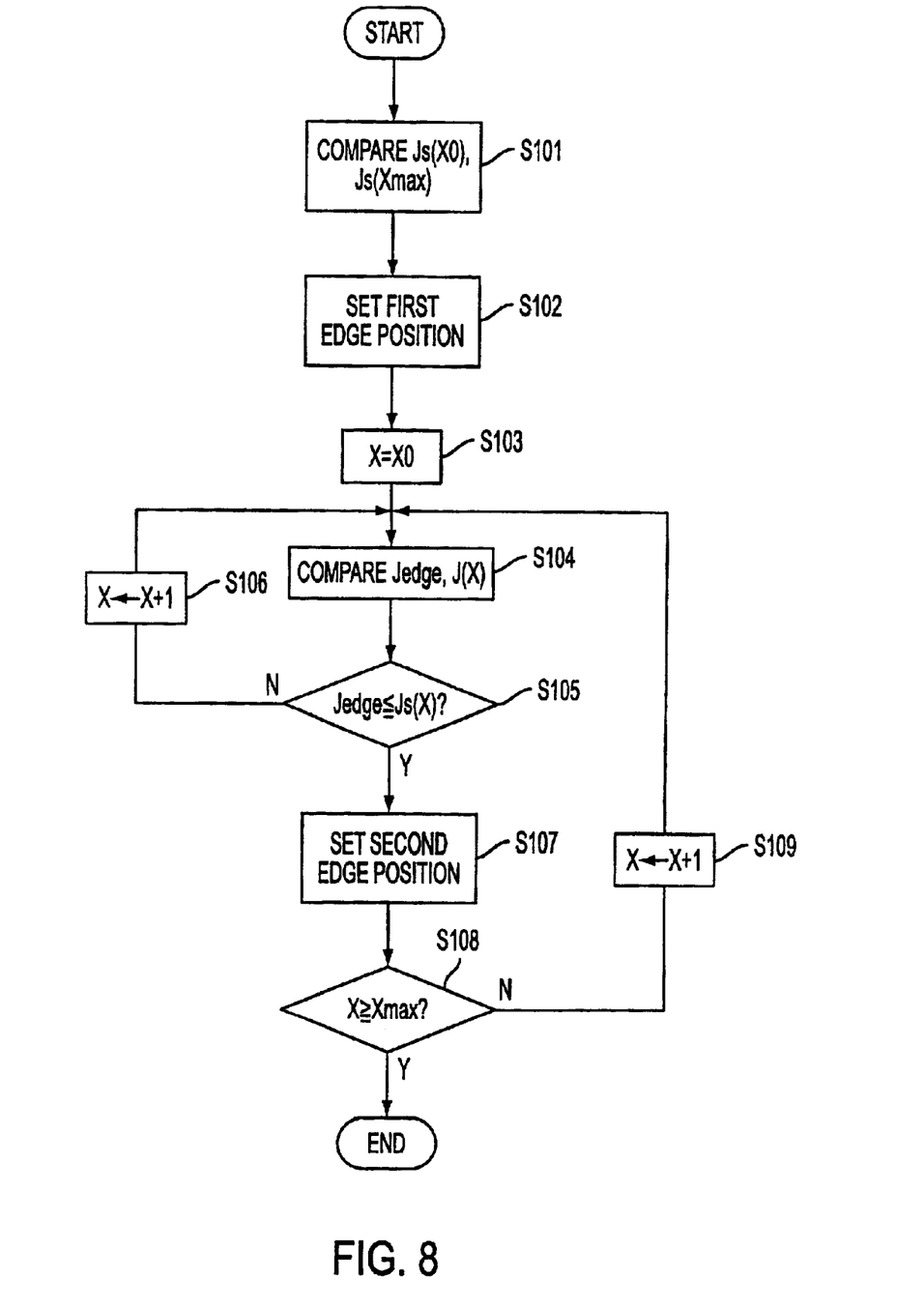
FIG. 8 is a flowchart expressing the edge position setting procedure of the invention.
Figure 9:
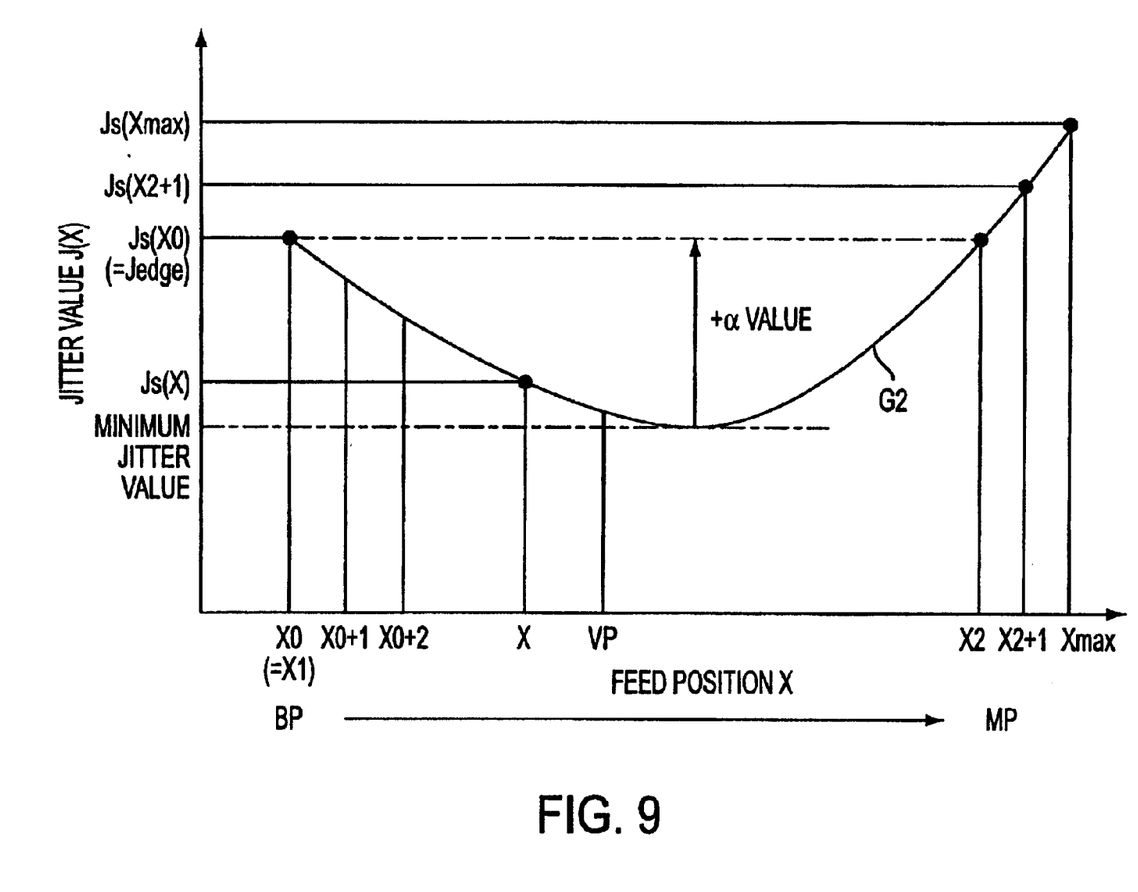
FIG. 9 is a graph explaining the edge position setting procedure of the invention.

(8-1) In jitter characteristics curve G2 shown in FIG. 9 in which feed positions X and jitter values Js(X) are plotted, the size of jitter values Js(X0) and Js(Xmax) at edge feed positions X0 and Xmax are compared (processing S101), and the feed position of the smaller jitter value Jedge is set as first edge position X1 (processing S102: first edge position setting step). In FIG. 9, Js(X0)≦Js(Xmax), so feed position X0 is taken as first edge position X1.

(8-2) When first edge position X1 is determined, taking this feed position X0 as the starting point (processing S103), one compares the jitter value Js(X) at each feed position with Jedge at first edge position X1 (processing S104), and one makes a comparison decision on whether jitter value Js(X) at each feed position X is greater than Jedge at first edge position X1 (processing S105). If jitter value Js(X) is less than Jedge, one updates feed position X to the next feed position X+1 (processing S106), compares Js(X) and Jedge, and searches for a feed position X for which Jedge≦Js(X).

(8-3) Once a feed position X where Jedge≦Js(X) is found, said feed position is set as second edge position X2 (processing S107: second edge position setting step). Next, one makes a comparison decision on whether feed position X for which this condition is satisfied has reached feed position Xmax (processing S108), and if it is decided that feed position X that has been set as second edge position X2 has not yet reached feed position Xmax, one updates feed position X to the next feed position X+1 (processing S109), and repeats the comparison between the jitter value at said feed position and Jedge.

(8-4) If it is decided that feed position X has reached Xmax, one stores first edge position X1 and second edge position X2 in RAM 44 and terminates edge position setting procedure S10.

(9) Based on first edge position X1 and second edge position X2 obtained in said edge position setting procedure S10, one computes the optimum position (processing S11:

optimum position computation procedure). Specifically, optimum position VP is set as the midpoint of first edge position X1 and second edge position X2, and is determined by the following formula <7>.

$$VP = (X1+X2)/2 \qquad <7>$$

(10) Optimum position VP having been computed by the optimum position computation procedure, control unit 43 generates a control command based on this optimum position VP, outputs it to skew adjustment unit 37, and adjusts the positioning of optical pickup 32 (processing S12: optimum position adjustment procedure).

(11) When the tilt position adjustment of optical pickup 32 has come to an end, then, so as to maintain said tilt position, control unit 43 outputs to skew adjustment unit 37 a control command to perform intermittent operation (processing S13) and initiates playback of the information recorded on optical disk 100 by optical pickup 32 (processing S14). If it is decided by aforesaid implementation decision procedure S4 that optical disk 100 is not a high-density information recording medium, then playback of the information by optical pickup 32 is initiated at center position CP, which was set in the manufacturing stage, without performing any of the series of processing from processing S5 to processing S12.

An embodiment such as described above has effects such as the following.

In edge position setting procedure S10, measurement of jitter values is terminated and the first edge position X1 and second edge position X2 are set under the condition that there are three tilt positions in a row that yield a jitter value that exceeds the jitter threshold value, so even if jitter values are measured in a part where the jitter values are spotwise bad, by making a comparison decision between jitter values Js(X) and Jedge across the entire measurement range of jitter values, one can avoid erroneously stopping the processing of taking in jitter values because of a disturbance, etc.

And in processing S53, a representative value for the jitter value at a prescribed tilt position is set by taking the average of 9 values, namely the 10 jitter values obtained at the innermost-circumference radius position of optical disk 100 excluding their maximum jitter value, thus making it possible to reduce the effect of disturbances such as scratches on the surface of optical disk 100, and by further reducing the effect of disturbances, etc., the optimum operation center position VP of the tilt position can be determined with greater accuracy.

In addition, because one obtains the jitter value at the innermost-circumference radius position, where information is sure to be recorded, the jitter value can be obtained by optical pickup 32 regardless of the size of optical disk 100 and the quantity of information recorded on it. Furthermore, by performing smoothing processing (jitter characteristics smoothing procedure) S9 followed by edge position setting procedure S10 and optimum position computation procedure S11, the optimum position VP can be computed while eliminating the variability in the jitter values caused by the surface deviation, etc. that occurs on individual optical disks 100, so optimum position adjustment procedure S12 makes it possible to more accurately position optical disk 100 and optical pickup 32.

In addition, by calculating smoothed jitter values Js(X) by above formulas <4>–<6> in smoothing processing S9 and performing edge position setting procedure S10 in the steps from processing S101 to processing S109, even if they have jitter characteristics that are asymmetrical with respect to optimum position VP, the optimum edge positions can be ascertained, and a more appropriate optimum position VP can be computed by optimum position computation procedure S10.

In addition, having implementation decision procedure S4 makes it possible to perform jitter value acquisition procedure S6, jitter characteristics smoothing procedure S9, edge position setting procedure S10, optimum position computation procedure S11, and optimum position adjustment procedure S12 only if optical disk 100 is a DVD-ROM or other high-density information recording medium, thus making it possible to dispense with these procedures and begin playback by optical pickup 32 more quickly for a CD-ROM or other recording medium whose recording density is relatively low.

This invention is not limited to the above described embodiment but also includes variations such as, but not limited to the following.

In the above described embodiment, the optical pickup position control method of this invention is applied to the tilt position control of optical disk 100 and optical pickup 32. However, the method may also be applied to focus bias adjustment in focus adjustment unit 35 of optical pickup 32, providing the same operation and effects as described in the above embodiment. In addition, while in the above embodiment, the optical pickup position control method of this invention is applied in optical disk device 30 mounted on entertainment device 1, it may also be applied to an optical disk device used in an ordinary personal computer.

In addition, while in the above described embodiment, smoothing processing S10 is performed by determining the average value of measured jitter values by formulas <4>–<6>, in the formula for smoothing the measured jitter values, the determination may be made by recursive calculation by the least-squares method.

In addition, while in the above described embodiment, computation of optimum position VP in optimum position computation procedure S11 is determined by formula <7>, the computation formula may be suitably modified according to the shape of jitter characteristics curve G2.

Also, for the specific structure and shape, etc. in implementing this invention, another structure, etc. may be adopted insofar as it is within the scope that allows the purpose of this invention to be achieved.

With the above-described optical pickup position control method of this invention, because in setting the edge positions the condition is imposed that there be at least two relative positions that yield a jitter value that exceeds the jitter threshold value, the effect is achieved that the optimum operation center position can be set without being affected by disturbances, etc.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. An optical pickup position control method that is used in an optical disk device that records and/or plays back information by shining an optical spot from an optical pickup onto an optical disk, and that positions the relative position of the optical disk and the optical pickup in a position that gives the optimum value of a jitter value of a detection signal obtained by detecting the reflected light of the optical spot, the method comprising:

(a) a jitter value acquisition procedure that performs multiple feed operations within the adjustment range of the relative position and obtains the jitter value at each feed position, (b) an edge position setting procedure that, based on the feed positions and jitter values obtained by the jitter value acquisition procedure, sets as the edge positions relative positions that will be greater than a preset prescribed jitter threshold value, (c) an optimum position computation procedure that computes the optimum position that will give the optimum value of the jitter value, based on the edge positions set by this edge position setting procedure, (d) an optimum position adjustment procedure that adjusts the relative position of the optical disk and the optical pickup to the optimum position computed by this optimum position computation procedure, (e) wherein the edge position procedure sets the edge positions on the condition that there are at least two relative positions that will give a jitter value that exceeds the jitter threshold value, and, (f) wherein the acquisition of the jitter value at each feed position in the jitter value acquisition procedure is achieved by rotating the optical disk at a prescribed speed, taking in multiple jitter values along the inside circumference of the optical disk, and taking the average of the obtained multiple jitter values excluding the maximum value.

2. An optical pickup position control method that is used in an optical disk device that records and/or plays back information by shining an optical spot from an optical pickup onto an optical disk, and that positions the relative position of the optical disk and the optical pickup in a position that gives the optimum value of a jitter value of a detection signal obtained by detecting the reflected light of the optical spot, the method comprising:

(a) a jitter value acquisition procedure that performs multiple feed operations within the adjustment range of the relative position and obtains the jitter value at each feed position, (b) an edge position setting procedure that, based on the feed positions and jitter values obtained by the jitter value acquisition procedure, sets as the edge positions relative positions that will be greater than a preset prescribed jitter threshold value, (c) an optimum position computation procedure that computes the optimum position that will give the optimum value of the jitter value, based on the edge positions set by this edge position setting procedure, (d) an optimum position adjustment procedure that adjusts the relative position of the optical disk and the optical pickup to the optimum position computed by this optimum position computation procedure, (e) wherein the edge position setting procedure sets the edge positions on the condition that there are at least two relative positions that will give a jitter value that exceeds the jitter threshold value, and (f) further comprising a jitter characteristics smoothing procedure that, following the jitter value acquisition procedure, smoothes the obtained jitter characteristics if the jitter characteristics by which the jitter values corresponding to the feed positions are plotted are judged not to conform to preset jitter characteristics, and the edge position setting procedure and the optimum position computation procedure are carried out based on the jitter characteristics smoothed by this jitter characteristics smoothing procedure.

3. A method as described in claim 1 or 2, further comprising an implementation decision procedure that decides, according to the type of the optical disk, whether to carry out the jitter value acquisition procedure, the edge position setting procedure, the optimum position computation procedure, and the optimum position adjustment procedure.

4. A method as described in claim 1 or 2, wherein the relative position is the tilt position between the optical disk and the optical pickup.

5. A method as described in claim 1 or 2, wherein the relative position is the focus position between the optical disk and the optical pickup.

6. A method as described in claim 1, further comprising an implementation decision procedure that decides, according to the type of the optical disk, whether to carry out the jitter value acquisition procedure, the edge position setting procedure, the optimum position computation procedure, and the optimum position adjustment procedure.

7. A method as described in claim 1, wherein the relative position is the tilt position between the optical disk and the optical pickup.

8. A method as described in claim 1, wherein the relative position is the focus position between the optical disk and the optical pickup.

9. A method as described claim 1, wherein the relative position is the tilt position between the optical disk and the optical pickup.

10. A method as described in claim 1, wherein the relative position is the focus position between the optical disk and the optical pickup.

11. A method as described in claim 2, wherein the jitter characteristics smoothing procedure is carried out so that, denoting the jitter values obtained at feed position $X0 \leq X \leq Xmax$ by $J(X0) \leq J(X) \leq J(Xmax)$, the smoothed jitter values $Js(X0), Js(X), J(Xmax)$ at each feed position are given by:

$$Js(X0)=[3 \times J(X0)+J(X0+1)]/4;$$

$$Js(X)=[J(X-1)+2 \times J(X)+J(X+1)]/4;$$

$$Js(Xmax)=[J(Xmax-1)+3 \times J(Xmax)]/4;$$

said edge position setting procedure has a first edge position setting step that takes as the first edge position the feed position of jitter value Jedge, which is the smaller of $Js(X0)$ and $Js(Xmax)$, and a second edge position setting step that compares the Jedge and each $Js(X)$ in sequence from this first edge position in the direction toward the feed position at which another $Js(X0)$ or $Js(Xmax)$ is taken, and takes as the second edge position the feed position at which $Jedge \leq Js(X)$, and said optimum position computation procedure calculates the midpoint of the first edge position and the second edge position and takes this midpoint as the optimum position.

12. A method as described claim 11, further comprising an implementation decision procedure that decides, according to the type of the optical disk, whether to carry out the jitter value acquisition procedure, the edge position setting procedure, the optimum position computation procedure, and the optimum position adjustment procedure.

13. A method as described in claim 11, wherein the relative position is the tilt position between the optical disk and the optical pickup.

14. A method as described in claim 11, wherein the relative position is the focus position between the optical disk and the optical pickup.

15. A method as described claim 2, further comprising an implementation decision procedure that decides, according to the type of the optical disk, whether to carry out the jitter value acquisition procedure, the edge position setting procedure, the optimum position computation procedure, and the optimum position adjustment procedure.

16. A method as described claim 2, wherein the relative position is the tilt position between the optical disk and the optical pickup.

17. A method as described claim 2, wherein the relative position is the focus position between the optical disk and the optical pickup.

* * * * *